United States Patent [19]

Meiners

[11] Patent Number: 4,703,810
[45] Date of Patent: Nov. 3, 1987

[54] DISC AND CHISEL PLOW IMPLEMENT

[75] Inventor: Elmo R. Meiners, Anchor, Ill.

[73] Assignee: M & W Gear Company, Gibson City, Ill.

[21] Appl. No.: 903,905

[22] Filed: Sep. 4, 1986

Related U.S. Application Data

[63] Continuation of Ser. No. 464,613, Feb. 7, 1983, abandoned.

[51] Int. Cl.$^4$ .................... A01B 15/14; A01B 49/02
[52] U.S. Cl. ................................... 172/178; 172/443; 172/327; 172/413
[58] Field of Search .............. 172/443, 178, 196, 140, 172/677, 680, 327, 326, 413, 676, 198, 145–149, 595, 597

[56] References Cited

U.S. PATENT DOCUMENTS

| | | | |
|---|---|---|---|
| 2,646,657 | 7/1953 | Robertson | 172/441 |
| 3,090,448 | 5/1963 | Hotchkiss | 172/178 |
| 3,450,212 | 6/1969 | Sylvester | 172/699 |
| 3,757,871 | 9/1973 | Maust | 172/178 |
| 3,931,858 | 1/1976 | North | 172/196 |
| 3,937,460 | 2/1976 | van der Lely | |
| 3,983,943 | 10/1976 | van der Lely | |
| 4,057,111 | 11/1977 | van der Lely et al. | |
| 4,073,346 | 2/1978 | Groth | 172/443 |
| 4,088,083 | 5/1978 | Dail, Jr. et al. | |
| 4,194,573 | 3/1980 | Rettkowski | 172/413 |
| 4,245,706 | 1/1981 | Dietrich, Sr. | |
| 4,271,912 | 6/1981 | Frye | 172/595 |
| 4,279,311 | 7/1981 | Dietrich, Sr. | |
| 4,308,919 | 1/1982 | Coughran, Jr. | |
| 4,313,503 | 2/1982 | Good | 172/178 |
| 4,324,295 | 4/1982 | Weichel | |
| 4,403,662 | 9/1983 | Dietrich | 172/196 |
| 4,406,329 | 9/1983 | Schlueter | 172/443 |
| 4,446,924 | 5/1984 | Dietrich | 172/140 |
| 4,650,006 | 3/1987 | Reimann | 172/443 |

FOREIGN PATENT DOCUMENTS 613303 12/1960 Italy.
2019703 11/1979 United Kingdom ................ 172/443

OTHER PUBLICATIONS

M & W Till 'N' Tote advertizing literature of M & W Gear Gibson City, Ill.
Great Plains Manufacturing, Inc. brochure entitled "No-Till Hitch", Roller Tine Hitch.
Great Plains Manufacturing, Inc. brochure entitled "Combination Drill Hitch".
The Lely Corporation-Lely-Roterra Catalog (1978) rear cover, showing Model RH 900-60.
The Tye Company brochure entitled "New Balanced Design Series IV Drill".
Graham-Hoeme brochure entitled "Graham-Hoeme Grain Drills—The Best Buy Going".
Dec. 1983 issue of FIN, p. 34 article entitled "New Drills Unveiled".
Best Manufacturing, Inc. brochure entitled "Grain Drill".
Crustbuster, Inc. brochure entitled "ExactaDepth Drills-No-Till Double Crop".
Crustbuster, Inc. brochure entitled "CrustBuster Fold N Tow ExactaDepth Drills".

Primary Examiner—Richard J. Johnson
Attorney, Agent, or Firm—Allegretti, Newitt, Witcoff & McAndrews, Ltd.

[57] ABSTRACT

An improved farm implement includes a frame having a forwad hitch which is maintained at a fixed position relative to the remainder of the implement during all stages of operation. The rear end of the frame includes running gear which may be raised and lowered to raise and lower an array of discs and chisel plows in order to cultivate a field, particularly a field which may includes a great amount of field stubble.

6 Claims, 5 Drawing Figures

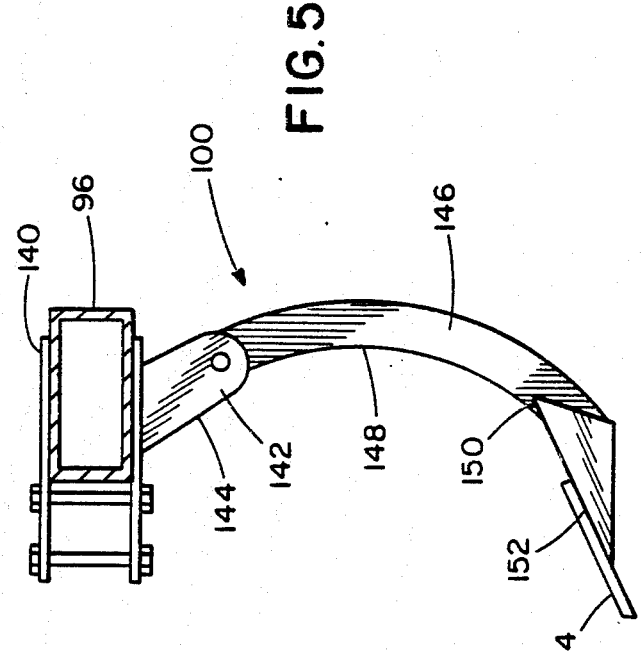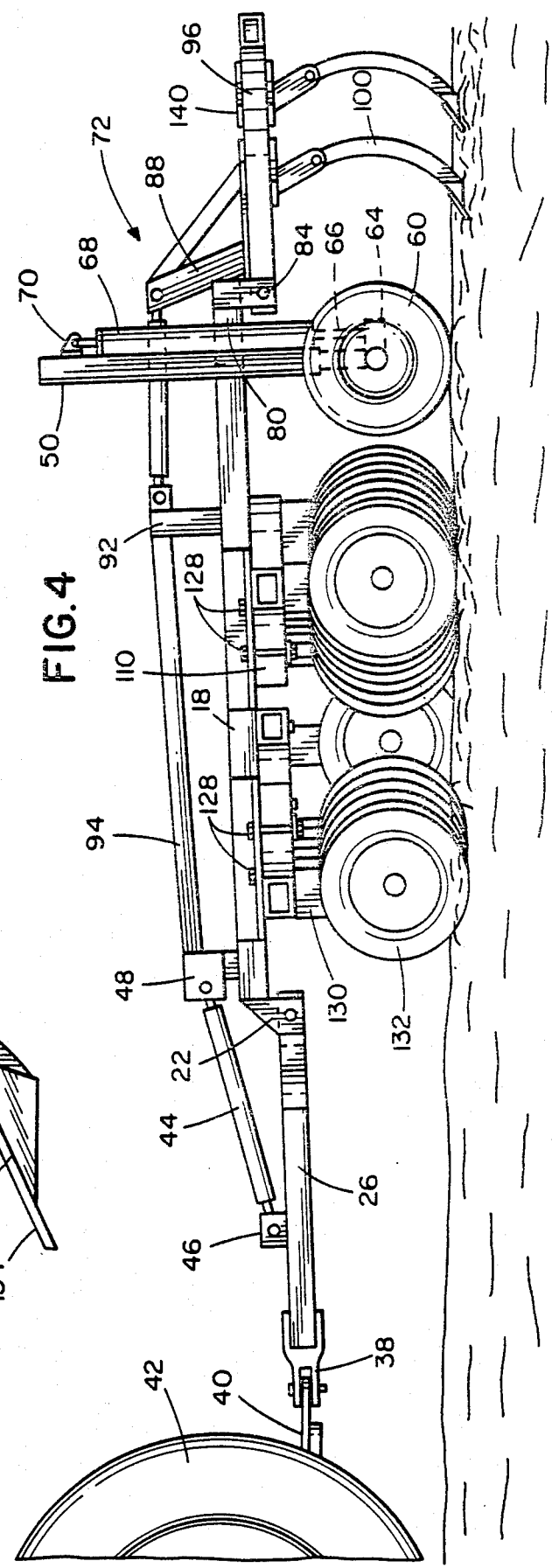

DISC AND CHISEL PLOW IMPLEMENT

This application is a continuation of application Ser. No. 464,613, filed Feb. 7, 1983, now abandoned.

BACKGROUND OF THE INVENTION

This invention relates to an improved soil tillage implement and more particularly to a tillage implement utilizing a specific combination of discs and chisel plows supported by a unique frame and especially useful for fall tillage particularly in fields having a high stubble content such as cornfields.

Subsequent to fall harvest, it is often desirable to plow the harvested field so that during the winter season the stubble in the field will decompose. Fall plowing also permits soil in a field to absorb moisture from winter snow and rain. Typically, fall plowing is done with a mold board plow or a gang of mold board plows. Plowing with mold board plows is especially necessary in harvested cornfields since the rubble and stubble associated with a cornfield will clog a chisel plow and prevent proper plowing of a field with such a chisel plow. Alternatively, a chisel plow may be used if extensive chopping or discing of the field occurs prior to chisel plowing. However, chopping or discing is a separate operation which adds to the cost of field preparation. Therefore, plowing with a mold board plow is the normal practice.

A potential disadvantage associated with mold board plowing results because the soil is completely turned over and buries the field rubble exposing the soil to erosion due to wind and water flow. Additionally, since air cannot get at the field stubble, decomposition of the stubble may be prevented particularly when the top layer of soil freezes. For this reason, it is often desirable to disc a cornfield in the fall and subsequently plow the field in the spring with chisel plows or mold board plows.

The present invention contemplates an improved combination disc and chisel plow of a special construction mounted on a unique frame which permits fall soil preparation in a field having a great deal of stubble such as a cornfield.

SUMMARY OF THE INVENTION

Briefly, the present invention comprises a frame with a hitch projecting from the forward end of the frame and a running gear positioned at the rear end of the frame. The running gear is designed to raise and lower the frame between a non-operating and an operating position while the hitch is maintained at a fixed position. Transverse tool bars are attached to the frame and support a series of discs for chopping field stubble and cutting into the soil. Positioned behind the discs are a series of special chisel plows arranged in a wedge configuration.

In operation, the frame is gradually lowered at its rear end when beginning a row. As the frame is initially lowered, the discs initially cut into the soil and stubble and prepare the soil for receipt of the chisel plows as the implement is drawn forward. Continuous lowering of the frame to a desired position permits the chisel plows to enter the soil gradually. The design of the chisel plows insures maintenance of the plows at a desired depth in the soil as the chisel plows move through the soil following the discs which cut and move the soil in front of the chisel plows.

Thus it is an object of the present invention to provide an improved fall tillage implement.

It is a further object of the present invention to provide an improved fall tillage implement which will plow the soil up to one foot in depth.

Still another object of the present invention is to provide an improved fall tillage farm implement which will effect tillage at a greater depth than prior art tillage implements yet which requires the same power as prior implements for moving the implement through a field.

Another object of the present invention is to provide an improved tillage implement which is movable through a field during the tillage operation at a faster rate than prior art implements and which requires less energy and thus less fuel in order to effect operation.

Another object of the present invention is to provide an improved fall tillage farm implement which reduces formation of ridges and thereby effects a reduction in erosion in a field tilled with the implement.

Still another object of the present invention is to provide an improved fall tillage farm implement which does not require prior discing or chopping of a harvested field particularly a field having stalks therein such as a cornfield.

Another object of the invention is to provide an improved fall tillage farm implement which maintains itself at a fixed level in the soil during the tillage operation and will not "ride out" from the soil.

One further object of the present invention is to provide an improved fall tillage farm implement utilizing a unique chisel plow construction in an array which will not plug or clog during operation of the implement.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is a side elevation of the implement in FIG. 1 in a partially lowered position upon the beginning of operation of the implement at the beginning of a row; and FIG. 5 is an enlarged side elevation of the unique chisel plow construction utilized with the present invention.

DESCRIPTION OF THE PREFERRED EMBODIMENT

Figure 1:
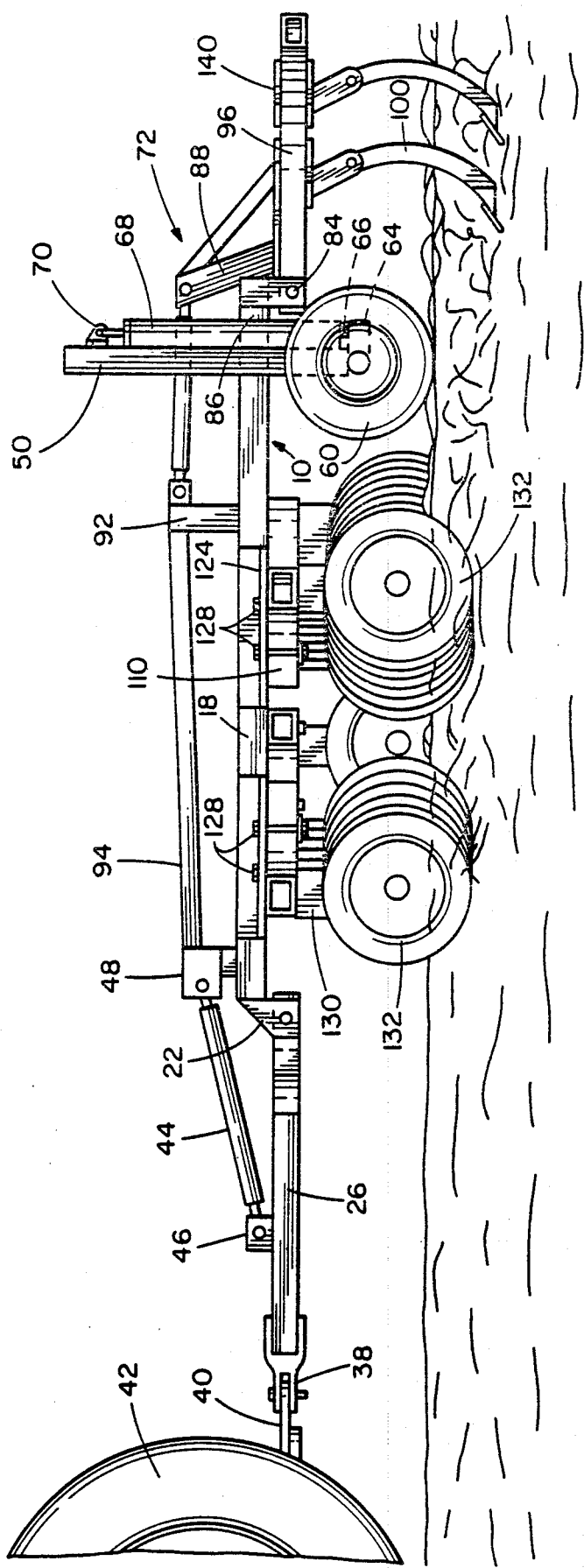
FIG. 1 is a side elevation of the improved farm implement of the invention.
Figure 2:
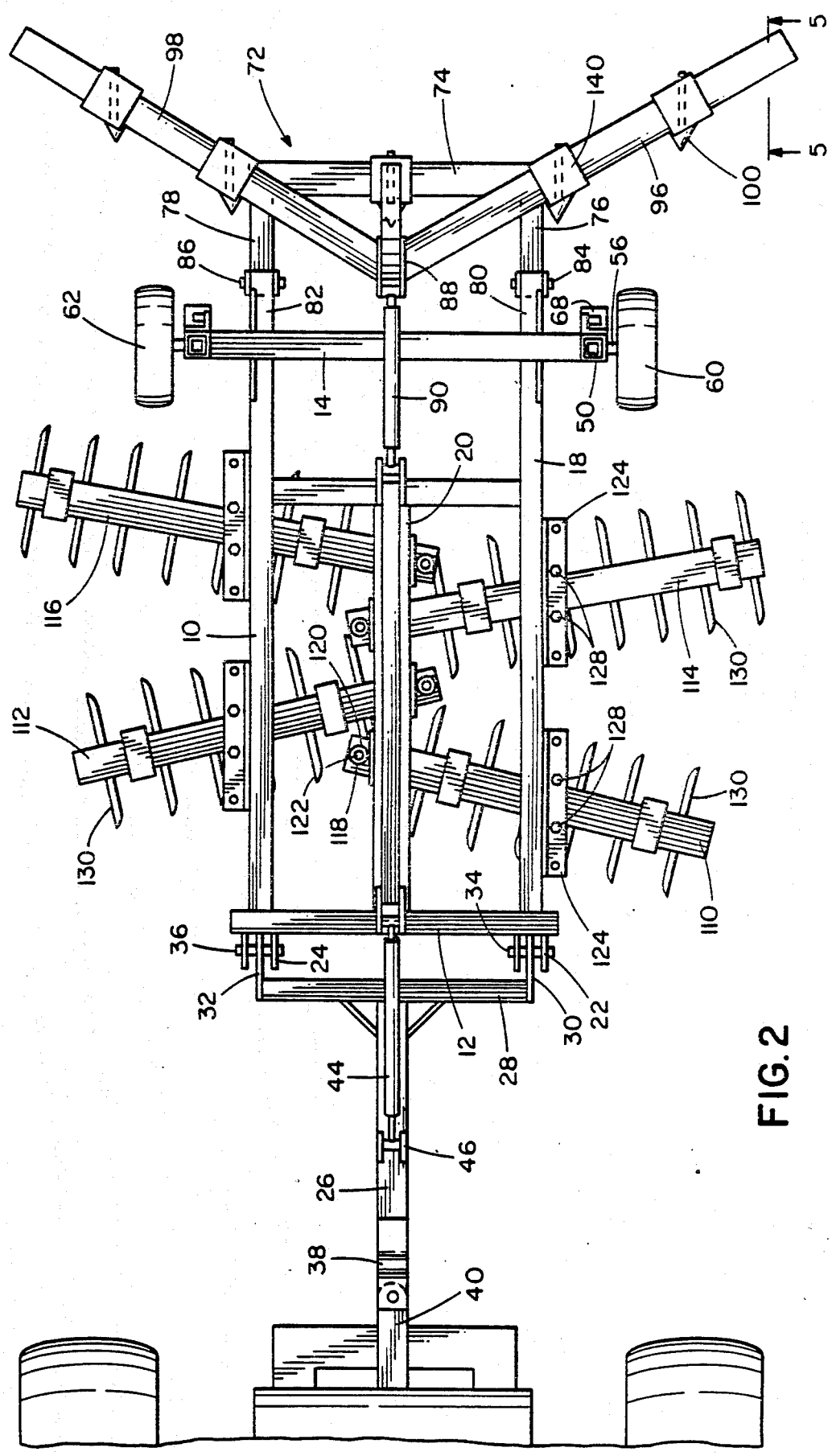
FIG. 2 is a top plan view of the implement of FIG. 1.

Referring particularly to FIGS. 1-4, the implement of the present invention includes a main frame 10 comprised of a forward cross member 12, a rear cross member 14, side longitudinal members 16 and 18, and a center frame longitudinal member 20 which are welded together to form a rectangular frame. Pivot support arms 22 and 24 extend from the opposite ends of the forward cross member 12. A draw bar 26 is attached to a drawbar cross member 28 which has projecting plates 30 and 32 that are connected by pivot members or pins 34, 36 to the pivot arms 22, 24. A hitch 38 is affixed to the forward end of the drawbar 26 for attachment to a hitch connector 40 associated with a pulling tractor 42.

A turnbuckle 44 is connected between a bracket 46 at the front of the drawbar 26 and a bracket 48 projecting from the forward cross member 12 of the frame 10. The turnbuckle 44 is adjustable in order to adjust the angle of inclination between the drawbar 26 and the frame 10.

Attached to the rear cross member 14 is a running gear comprised of vertical hollow beams 50, 52 which are welded to the outside ends of the cross member 14. A wheel support shaft 54, 55 projects telescopically into each tube 50, 52. Each shaft 54, 55 is connected at its lower end to an axle 56, 58, respectively, which are, in turn, connected to wheels 60, 62, respectively. Each shaft 54, 55 includes a projecting bracket 64 which is connected to a rod 66 associated with a drive cylinder 68. The opposite end of the cylinder 68 is attached to a bracket 70 affixed to the beam 50. Cylinder 68 is a hydraulic cylinder and is controlled through a hydraulic line 71 by means of hydraulic controls 73 mounted on the tractor 42. By controlling the hydraulic actuation of cylinder 68 from the tractor 42, it is possible to raise and lower the wheels 60, 62 simultaneously. Raising and lowering the wheels 60, 62 simultaneously will cause the frame 10 to raise at its rear end and pivot upwardly about the point defined by the attachment of the hitch 38 to the hitch connection 40.

Attached by means of a three point hitch connection to the rear end of the frame 10 is a special chisel plow tool bar assembly 72. Tool bar assembly 72 includes a cross member 74 with projecting brackets 76 and 78. Brackets 76, 78 are pivotally attached to plates 80, 82, respectively, extending from rear frame member 14, by means of pins 84, 86, respectively. The third connection of the three point hitch is a vertical support bracket 88 extending from cross member 74 attached to a turnbuckle 90. The opposite end of the turnbuckle 90 is attached to a vertical support member 92 projecting from the center member 20 of the frame 10. The turnbuckle 90 is adjustable so that the angle of inclination of the assembly 72 may be adjusted. A reinforcing strut 94 connects brackets 48 and 92. The assembly 72 includes inclined outrigger tool bars 96, 98 connected to the center transverse member 74. The bars 96, 98 form an angle of 30° minus 5° plus 10° with respect to the transverse member 74.

Attached at spaced intervals to the member 74 and bars 96, 98 are chisel plows 100. Thus, a chisel plow 100 is positioned substantially at the center of the assembly 72. Spaced therefrom by a distance of at least 15 inches on either side of the center chisel plow 100 are outrigger chisel plows 100. Thus, a series of chisel plows 100 are arranged in a V-shaped configuration. This configuration prevents clogging of the space between the chisel plows 100 and also decreases drag when pulling the chisel plows 100 through a field.

Suspended from the frame 10 are a series of four tool bars 110, 112, 114, 116. The bars 110, 112, 114, 116 are each attached to the frame 10 in the same manner. Thus, a description with respect to the bar 110 applies with respect to the remaining bars 112, 114, 116.

Referring to the figures, the bar 110 includes an inner end opening 118 with a bushing for receipt of a mounting pin. Opening 118 is aligned with an opening 121 associated with a bracket 120 attached to the center member 20 of the frame 10. An attachment pin 122 then fits through the openings 118, 121 to retain the bar 110.

A bracket or gusset plate 124 attached to the outside frame member 18 cooperates with the bar 110 to support the bar 110 on the frame 10. That is, gusset plate 124 is attached to the frame member 18. The gusset plate 124 includes a series of openings 126. Clamp bolts 128 are affixed to appropriate openings 126 to clamp the bar 110 at a desired angle with respect to the frame 10. Thus, the orientation of the bar 110 may be adjusted with respect to the frame 10. Generally the bar 110 is positioned in the range of 5° to 20° from a direction transverse to the frame 10 with a nominal preferred angle of inclination being 15°. The two forward bars 110, 112 are inclined forwardly whereas the two rearward bars 114, 116 are inclined rearwardly with respect to the transverse direction of the frame 10. Also, the forward bars 110, 112 extend outwardly a lesser distance than the rearward bars 114, 116. The reasons for this will become apparent in view of the further description.

Mounting brackets 130 are suspended from the bars 110, 112, 114, 116 and support a series of discs 132. The discs 132 associated with the forward bars 110, 112 are arranged in a position to throw dirt outwardly away from the frame 10. Thus, the discs 132 are arranged with their concave surfaces directed outwardly. Preferably the discs 132 are spaced about 15" apart to avoid plugging and to permit running of the discs 132 through stalks in a cornfield, for example. The discs 132 associated with the rear bars 114, 116 are directed inwardly with their concave surfaces. In this manner, dirt which has been thrown outwardly due to the forward discs 132 on bars 110, 112 will be redirected inwardly by the discs 132 associated with the rearward bars 114, 116. Also, since the forward discs 132 initially throw soil outwardly, the rear discs 132 are spaced a greater distance from the frame 10 to thereby redirect the soil to its original position. Positioning of the rear discs 132 therefore necessitates longer rear tool bars 114, 116.

The discs 132 are arranged so that they will cut 4" to 5" in the soil during normal operating of the implement. Preferably, however, the discs 132 on the rearward bars 114, 116 have a greater diameter than those on the forward bars 110, 112 so that the rearward discs 132 will cut more deeply into the ground.

FIG. 5 illustrates the special construction of the chisel plow 100 of the invention which is mounted on the bracket assembly 72. Thus, a chisel plow 100 shown in FIG. 5 includes a mounting bracket 140 which is affixed to a bar, for example, member 74. Depending from the bracket 140 are spaced support plates 142 which include a front surface 144 that is angled rearwardly. Retained by the support plates 142 is a chisel bar 146. Chisel bar 146 has an arcuate shape which defines a smooth transition from surface 144 to the direction of implement travel. The arcuate surface of the bar 146 terminates at a fixed point 150 and from that point forward defines a straight, downwardly inclined surface 152. An optional wear plate 154 may be affixed at the forward end of the bar 146.

The straight, inclined surface 152 preferably defines an angle of attack or cut into the soil of about 28° as illustrated. This angle was determined empirically and may vary plus or minus 2°. The particular angle of cutting into the soil is desired in order to maintain the chisel plow 100 at the proper depth in the soil during field operation and prevent the plow from "riding out" of the soil or cutting too deeply into the soil. The surface 152 extends from point 150 at the given angle of inclination for a distance that defines a vertical drop of approximately 8" to 10". In practice it has been found that this particular configuration of chisel plow 100 with the dimensions noted correlates with a depth of operation of the chisel plow 100 of 12". This is significantly deeper than prior art chisel plow constructions.

Figure 3:
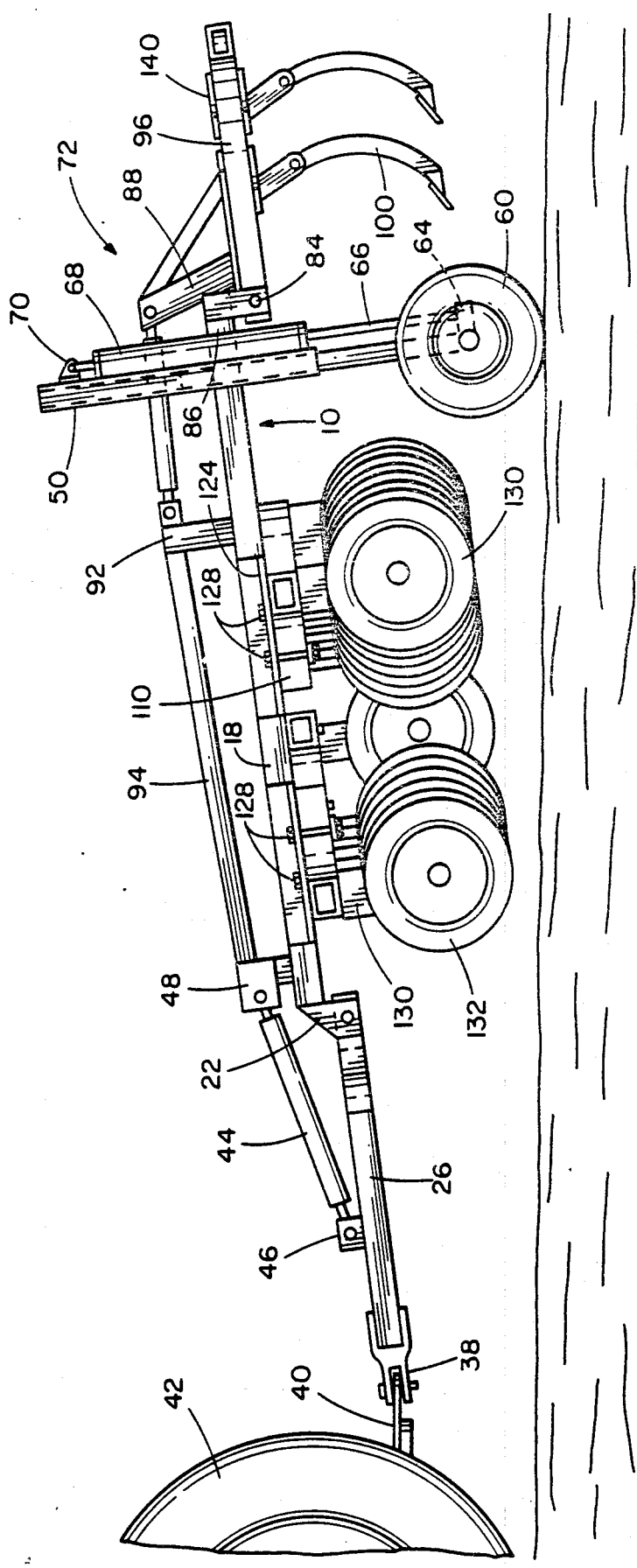
FIG. 3 is a side elevation of the implement of FIG. 1 with the implement in the raised or road travel position.

In operation, the implement of the present invention is initially maintained in the position illustrated in FIG. 3. In this position the wheels 60, 62 are extended by operation of the cylinder 68 associated with each wheel. When in this position, the discs 132 as well as the chisel plows 100 are suspended above the level of the soil though the hitch 38 is maintained at its fixed position relative to the tractor 42 and the soil.

At the beginning of operation of the implement at the beginning of a row in a field, the wheels 60, 62 are lowered gradually to a position, for example, as shown in FIG. 4 as the implement is drawn forward to start a row. When in this position, the forward discs 132 begin to cut into the soil and cut the field stubble while also throwing dirt outwardly from the frame 10. Continuous lowering of the implement as the implement moves forward will cause the rear discs 132 to also engage the soil, cut the stubble and throw the soil inwardly toward the frame 10. Simultaneously the chisel plows 100 begin to cut into the soil which has been agitated and cut by the discs 132. The discs 132 initially engage the soil and field stubble and then the chisel plow 100 engages that soil. This step by step movement prevents the chisel plows 100 from becoming clogged. As the entire implement is moved in a forward direction and lowered, the discs 132 further cut into the soil to their normal operation depth as illustrated in FIG. 1 and the chisel plows 100 also move to their normal operating depth as illustrated in FIG. 1.

The design of the discs 132 and more particularly the design of the chisel plows 100 tend to maintain the chisel plows 100 at an operational depth which is an increased depth relative to prior art structures. The discs 132 cut and move the soil and stubble back and forth eliminating the problem of clogging the chisel plows 100 with field stubble. As a result of the increased depth of penetration of the chisel plows 100, improved moisture flow and herbicide flow into the soil is obtained. Additionally, some of the field stubble is maintained along the top of the field in order to prevent erosion and enhance decomposition of the stubble. Ridging of the soil is also reduced which tends to reduce erosion. A complete fall field plowing operation in a single pass through a field is then possible without additional discing or chopping.

There are many variable settings which may be made with respect to the present implement in order to enhance its operation. That is, the number and spacing of discs, the size of discs, the angle of inclination for the tool bars, the adjustment of the turnbuckles 44 and 90, the arrangement of the chisel plows on the tool bars and the spacing of the chisel plows are all variable in order to enhance the operation of the implement. Thus, while there has been set forth a preferred embodiment of the invention, it is to be understood that the invention is to be limited only by the following claims and their equivalents.

What is claimed is:

1. Improved tillage apparatus comprising, in combination:

a tool bar frame, said frame including a forward end with a drawbar extending therefrom, said drawbar having a hitch at its forward end for attachment to a pulling vehicle and for maintaining the forward end at a fixed elevation relative to ground level, said frame also including a rear end, a generally longitudinal center frame member, a forward vertical support bracket at the middle of the forward end of the frame, a rearward vertical support bracket at the middle of the rearward end of the frame, and a generally horizontal reinforcing strut connecting the forward bracket to the rearward bracket;

running gear attached to the rear end of the frame for supporting the frame at the rear end;

means for elevating and lowering the running gear to thereby raise and lower the frame to a desired elevation and inclination relative to ground level as the forward end of the drawbar remains at a fixed elevation;

means for mounting a plurality of disc members on the frame generally transverse to the direction of field travel for cutting field stubble and for working the soil, said means for mounting disc members including a plurality of cross beam tool bars for mounting discs, said bars attached to the frame and extending generally in a direction transverse to the direction of vehicle travel, said tool bars including a first forward disc tool bar and a second rearward disc tool bar, one of said disc tool bars having an outside end angled toward the direction of vehicle travel and an inside end terminating substantially at the center frame member, a plurality of spaced discs mounted thereon on the forward disc tool bar, each disc positioned in a concave position to thereby cut and throw soil in a first direction transverse to the frame as the apparatus traverses a field, and the other disc tool bar spaced in the direction of field travel from the one disc tool bar, said other tool bar also having an outside end and an inside end, said inside end terminating substantially at the center frame member, said other tool bar angled away from the direction of vehicle travel and having a plurality of spaced discs mounted thereon in a concave position to thereby cut and throw soil oppositely to the first direction, said other tool bar supporting at least one disc laterally spaced from the frame for a greater distance than discs on the one tool bar, said discs of said separate tool bars cooperating to provide means whereby soil thrown outwardly is redirected inwardly to its original upon traversing a field;

a plurality of chisel plow members mounted on a separate tool bar attached to the frame behind the disc members by an adjustable three point hitch, said three point hitch including first and second connections to the rear end of the frame and a third connection at the top end of a generally vertical bracket extending from the separate chisel plow tool bar, said plow members mounted in a non-parallel array for working the soil upon movement in the direction of field travel;

means for controlling the lowering and raising of the running gear to adjust the inclination of the frame from a raised rear end position during commencement of a furrow when the rear end of the frame is raised to incline the frame and prevent penetration of the disc members and plows into soil, said running gear having means for progressively lowering the rear end of the frame and progressively engaging the disc members and subsequently the plow members into the soil, said disc members initially cutting field stubble as the apparatus is pulled through a field so that the plow members will not clog and will uniformly penetrate the soil upon forward movement of the apparatus;

an adjustable length link connected from the forward bracket to the drawbar to control the angle of attachment of the drawbar to the frame; and an adjustable length link pivotally connected at its ends respectively to the vertical rearward bracket and to the third connection of the three point hitch for the chisel plow tool bar, said link adjustable to control the angle of inclination of attachment of the chisel plow tool bar to the frame.

2. Improved tillage apparatus of claim 1 including a forwardly extending drawbar pivotally connected to the frame to pivot about a generally horizontal axis, said axis transverse to the direction of field travel, and an adjustable linkage fastening the drawbar to the frame to limit pivotal movement of the drawbar relative to the frame.

3. Improved tillage apparatus of claim 1 wherein the running gear comprises first and second wheels, each wheel mounted on a separate axle, each axle being attached to the frame by an adjustable linkage for raising and lowering the frame at the rear end.

4. The apparatus of claim 1 wherein all of the bars are adjustably attached to the frame to vary the angle of penetration of discs in soil.

5. The apparatus of claim 1 wherein each chisel plow member includes an arcuate, depending rod attached to the plow bar and extending in an arcuate path rearwardly from the attachment and then forwardly in a continuous curved arc, said plow rod terminating with a soil cutting section defining a substantially straight line soil cutting surface forming an angle in the range of 26° to 30° from the horizontal along a rise of 8 to 10 inches.

6. The apparatus of claim 1 wherein the plows mounted on the plow tool bar are in an array inclined from transverse to the direction of vehicle travel in the range of 25° to 40°.

* * * * *